United States Patent
Seo et al.

(10) Patent No.: US 7,376,188 B2
(45) Date of Patent: May 20, 2008

(54) FORMAT STRUCTURE OF SERIAL DATA AND SERIAL DATA CONVERSION APPARATUS

(75) Inventors: Sang-Il Seo, Gyeonggi-Do (KR);
Ha-Jin Hwang, Gyeonggi-Do (KR);
Chul-Yong Joung, Seoul (KR);
Nam-Seok Jo, Gyeonggi-Do (KR);
Dong-Il Han, Seoul (KR); Jong-Seok Park, Gyunggi-Do (KR)

(73) Assignee: LG Electronics Inc., Seoul (KR)

( * ) Notice: Subject to any disclaimer, the term of this patent is extended or adjusted under 35 U.S.C. 154(b) by 870 days.

(21) Appl. No.: 10/660,619

(22) Filed: Sep. 12, 2003

(65) Prior Publication Data

US 2004/0051655 A1    Mar. 18, 2004

(30) Foreign Application Priority Data

Sep. 16, 2002    (KR) .................. 10-2002-0056203

(51) Int. Cl.
*H04B 1/66* (2006.01)

(52) U.S. Cl. .................. 375/240.26; 375/240.01; 375/240.28; 348/423.1

(58) Field of Classification Search ........... 375/240.01; 341/146; 348/423, 423.1
See application file for complete search history.

(56) References Cited

U.S. PATENT DOCUMENTS 5,903,569 A * 5/1999 Fujisaki .................. 370/472
6,323,909 B1 * 11/2001 Michener et al. .......... 348/512

(Continued)

FOREIGN PATENT DOCUMENTS

EP       0 690 630 A2    1/1996

(Continued)

OTHER PUBLICATIONS

SMPTE Journal, "Proposed SMPTE Standard for Television- Bit Serial Digital Interface for High-Definition Television Systems", vol. 104, No. 10, pp. 704-707, (Oct. 1995). XP000531643.

(Continued)

*Primary Examiner*—Marsha D. Banks-Harold
*Assistant Examiner*—Christopher Findley
(74) *Attorney, Agent, or Firm*—Birch, Stewart, Kolasch & Birch, LLP

(57) ABSTRACT

Disclosed is a serial data conversion apparatus comprising: a video signal packet conversion unit for converting a characteristic signal of a video signal into a video signal characteristic packet and simultaneously converting a video signal into a video signal packet by the characteristic signal of a video signal, horizontal/vertical synchronization signals, and a video clock signal; an audio signal packet conversion unit for converting a characteristic signal of an audio signal into an audio signal characteristic packet and simultaneously converting an audio signal into an audio signal packet by the characteristic signal of an audio signal, left/right control signals, and an audio clock signal; a control signal packet conversion unit for converting a control signal into a control signal packet by an informing signal which informs a generation of a control signal; and a multiplexer for switching and selecting the video signal characteristic packet, the video signal packet, the audio signal characteristic packet, the audio signal packet, and the control signal packet by a certain format structure.

6 Claims, 2 Drawing Sheets

U.S. PATENT DOCUMENTS

| | | | |
|---|---|---|---|
| 6,470,142 B1 * | 10/2002 | Isozaki et al. | 386/124 |
| 6,501,904 B1 * | 12/2002 | Kuroda et al. | 386/109 |
| 6,618,095 B1 * | 9/2003 | Takeuchi et al. | 348/476 |
| 6,690,428 B1 * | 2/2004 | Hudelson et al. | 348/461 |
| 2002/0172154 A1 * | 11/2002 | Uchida et al. | 370/229 |
| 2003/0099011 A1 * | 5/2003 | Murakami | 359/115 |

FOREIGN PATENT DOCUMENTS

| | | |
|---|---|---|
| EP | 1 231 795 A2 | 8/2002 |
| EP | 1 335 591 A2 | 8/2003 |
| WO | WO-03/032621 A2 | 4/2003 |

OTHER PUBLICATIONS

SMPTE Journal, "Proposed SMPTE Standard for Television- 24-Bit Digital Audio Format for HDTV Bit-Serial Interface", vol. 105, No. 8, pp. 516-523, (Aug. 1996). XP000627185.

* cited by examiner

FORMAT STRUCTURE OF SERIAL DATA AND SERIAL DATA CONVERSION APPARATUS

This nonprovisional application claims priority under 35 U.S.C. §119(a) on Patent Application No. 2002-0056203 filed in Korea on Sep. 16, 2002, which is herein incorporated by reference.

BACKGROUND OF THE INVENTION

1. Field of the Invention

The present invention relates to a format structure of serial data and a serial data conversion apparatus, and more particularly, to a format structure of serial data including video/audio/and control packet signals transmitted from a source device as an optical signal form through one optical cable, and an apparatus for converting the video/audio/and packet signals into serial data so that they may have the format structure.

2. Description of the Related Art

With a development of electronics technology, many flat panel display devices have been developed. Also, as a display device such as a television receiver and a monitor for displaying videos, a thin and light flat panel display device is being adopted instead of a voluminous and heavy CRT.

The flat panel display device is divided into a device using an inorganic substance and a device using an organic substance. The device using an inorganic substance includes a plasma display panel (PDP) using photo luminescence (PL), a field emission display (FED) device using a cathode luminescence (CL), and etc., and the device using an organic substance includes a liquid crystal display element (LCD), an organic electro-luminescence (EL) display device, and etc.

Among these flat panel display devices, the PDP has a high brightness, a high luminescence efficiency, a wide viewing angle, excellent heatproof, coldproof, and quakeproof characteristics, a light weight, and a cheap fabrication cost. Also, the PDP can easily realize full colors, thereby widely being adopted as a display screen of display devices such as a television receiver and a monitor. Besides, a display device using the PDP as a display screen is light and thin, thereby being much developed as a wall-mounted type.

In order to make the display device output videos and audios, video and audio signals outputted from a source device such as a set top box are inputted into the display device using the PDP. Like this, in the conventional art, plural cables were connected between the display device and the source device in order to output videos and audios of the display device. According to this, the video and audio signals of the source device were transmitted to the display device through the cables, and certain control signals were transmitted between the display device and the source device through the cables.

Hereinafter, transmissions and receptions of the video, audio, and control signals between the display device and the source device through the cables will be explained.

FIG. 1 is an exemplary view showing a connection relation between a display device and a source device in accordance with the conventional art. Herein, the reference numeral 100 denotes a wall-mounted type display device using the PDP as a display screen such as a wall-mounted type monitor or a wall-mounted type television receiver.

The reference numeral 110 denotes a digital device such as a digital video tape recorder (VTR) or a digital video disc (DVD) for outputting a transport packet stream corresponding to digital video and audio signals by reproducing certain media, and the reference numeral 120 denotes an analogue device such as a VTR or a computer system for outputting analogue video and audio signals by reproducing media such as a video tape.

The reference numeral 130 denotes a source device such as a set top box for receiving a digital broadcasting signal, receiving the transport packet stream outputted from the digital device 110 and analogue video and audio signals outputted from the analogue device 120 and thus selectively switching them, and transmitting the switched signals to the display device 100.

In the conventional device, the plural digital devices 110 and the source device 130 are connected by wire such as an IEEE 1394, and the digital devices 110 output a transport packet stream corresponding to digital video and audio signals by reproducing certain media. The outputted transport packet stream is transmitted to the source device 130 through the IEEE 1394 cable and etc.

The analogue devices 120 and the source device 130 are connected by a coaxial cable. The analogue devices 120 generate analogue video/R,G,B/audio signals by reproducing certain media, and the generated analogue signals are transmitted to the source device 130 through the coaxial cable and etc.

The source device 130 receives a digital broadcasting signal by a mounted advanced television systems committee (ATSC) tuner and etc., and converts a transport packet stream corresponding to the received digital broadcasting signal and a transport packet stream inputted from the digital devices 110 into analogue video and audio signals. Then, the source device 130 switches the converted analogue video and audio signals and analogue video and audio signals inputted from the analogue devices 120 by a user's selection, and transmits to the display device 130. Herein, the source device 130 transmits the analogue R, G, B signals and analogue audio signals of L/R channels to the display device 100 through respective cables.

Also, additional control and response cables are connected between the display device 100 and the source device 130, and through the control/response cables, certain control signals and response signals corresponding to the control signals are transmitted.

However, in the conventional art, the display device 100 and the source device 130 are connected by plural cables. Therefore, in case that the display device 100 is installed on a wall as a wall-mounted type and the source device 130 is installed on a shelf, cables for transmitting the analogue R, G, B signals and the analogue audio signals and cables for transmitting the control signals and the corresponding response signals are exposed onto the wall between the display device 100 and the source device 130. Besides, the exposed cables have thick diameters thus to have a bad appearance.

Accordingly, the display device 100 and the source device 130 can be connected to each other by one optical cable which is thin thus to be hardly noticed from a far distance, and the source device 130 can convert video/audio/control signals and video/audio signal characteristics into an optical signal thus to transmit to the display device through an optical fiber. Then, the display device 100 can receive the optical signal and process it.

In order to transmit the respective signals from the source device 130 to the display device 100 through the optical fiber as the optical signal form, 8-bit data has to be converted into 10-bit data so as to be preferably transmitted as the optical signal form, and the optical signal has to be transmitted by being converted into serial data of a certain format since it can not be transmitted as parallel data.

Therefore, the source device 130 selects the respective signals by an order of the certain format thus to encode, and converts parallel data of 8 bits into data of 10 bits. Then, the source device 130 converts the parallel data of 10 bits into serial data again, and transmits as the optical signal form through the optical fiber.

However, in case that the video/audio/control signals are converted into the serial data by the source device 130 and transmitted as the optical signal, clock signals according to the video/audio signals, horizontal/vertical synchronization signals according to the video signals, horizontal/vertical active signals according to the video signals can not be transmitted as the optical signal form due to characteristics of the optical cable. Therefore, in case that video/audio/control signals are transmitted by being converted into serial data, the display device 100 has to be able to restore the clock signals, the horizontal/vertical synchronization signals according to the video signals, and the horizontal/vertical active signals according to the video signals into serial data.

SUMMARY OF THE INVENTION

Therefore, an object of the present invention is to provide a format structure of serial data including video/audio/and control packet signals which can be transmitted from a source device through one optical cable as an optical signal form.

Another object of the present invention is to provide an apparatus for converting video/audio/and control signals into serial data having the format structure.

To achieve these and other advantages and in accordance with the purpose of the present invention, as embodied and broadly described herein, there is provided a serial data conversion apparatus comprising: a video signal packet conversion unit for converting a characteristic signal of a video signal into a video signal characteristic packet and simultaneously converting a video signal into a video signal packet by the characteristic signal of a video signal, horizontal/vertical synchronization signals, and a video clock signal; an audio signal packet conversion unit for converting a characteristic signal of an audio signal into an audio signal characteristic packet and simultaneously converting an audio signal into an audio signal packet by the characteristic signal of an audio signal, left/right control signals, and an audio clock signal; a control signal packet conversion unit for converting a control signal into a control signal packet by an informing signal which informs a generation of a control signal; a multiplexer for switching and selecting the video signal characteristic packet, the video signal packet, the audio signal characteristic packet, the audio signal packet, and the control signal packet by a certain format structure; a switching control unit for controlling a conversion of the video signal packet, the audio signal packet, and the control signal packet and controlling a switching operation of the multiplexer; an encoder for encoding an output signal of the multiplexer; a parallel/serial conversion unit for converting an output signal of the encoder into serial data; and an optical signal transmitting unit for converting serial data converted at the parallel/serial conversion unit into an optical signal and then transmitting.

Herein, the video signal packet conversion unit includes: a video signal characteristic recognizing unit for recognizing video signal characteristics by a characteristic signal of a video signal and generating a video signal characteristic packet; a video signal control unit for generating a header and a tail of a video signal by video signal characteristics recognized by the video signal characteristic recognizing unit, horizontal/vertical synchronization signals, and a video clock signal and simultaneously controlling a storage and an output of a video signal; a video signal memory unit for storing and outputting a video signal by a control of the video signal control unit; and a multiplexer for selecting a header and a tail of the video signal control unit and a video signal of the video signal memory unit by a control of the switching control unit and thus generating a video signal packet.

Also, the audio signal packet conversion unit includes: an audio signal characteristic recognizing unit for recognizing audio signal characteristics by a characteristic signal of an audio signal and generating an audio signal characteristic packet; an audio signal control unit for generating a header and a tail of an audio signal by audio signal characteristics recognized by the audio signal characteristic recognizing unit, left/right control signals, and an audio clock signal and simultaneously controlling a storage and an output of an audio signal; an audio signal memory unit for storing and outputting an audio signal by a control of the audio signal control unit; and a multiplexer for selecting a header and a tail of the audio signal control unit and an audio signal of the audio signal memory unit by a control of the switching control unit and thus generating an audio signal packet.

Besides, the control signal packet conversion unit includes: a control signal control unit for generating a header and a tail according to an informing signal of a control signal and controlling a storage and an output of a control signal; a control signal memory unit for storing and outputting a control signal according to a control of the control signal control unit; and a multiplexer for selecting a header and a tail of the control signal control unit and a control signal of the control signal memory unit by a control of the switching control unit and thus generating a control signal packet.

Also, a serial data format structure according to the present invention includes: a plurality of video signal packets including a header and a tail for informing a start and an end of a video signal; and an audio signal packet, a control signal packet, a video signal characteristic packet, and an audio signal characteristic packet located between the plurality of video signal packets, in which the audio signal packet includes left/right audio signals, the control signal packet includes a control signal, the video signal characteristic packet includes resolution information of a video signal, and the audio signal characteristic packet includes left/right control signals of an audio signal and frequency information of an audio clock signal.

The plurality of video signal packets are provided with a blanking header in case that a video signal is in a blanking block, and are provided with an active header in case that a video signal is in an active block. Also, the audio signal packet, the control signal packet, the video signal characteristic packet, and the audio signal characteristic packet include a header and a tail, respectively.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a serial data format structure and a serial data conversion apparatus according to the present invention will be explained with reference to FIGS. 2 and 3.

Figure 1:
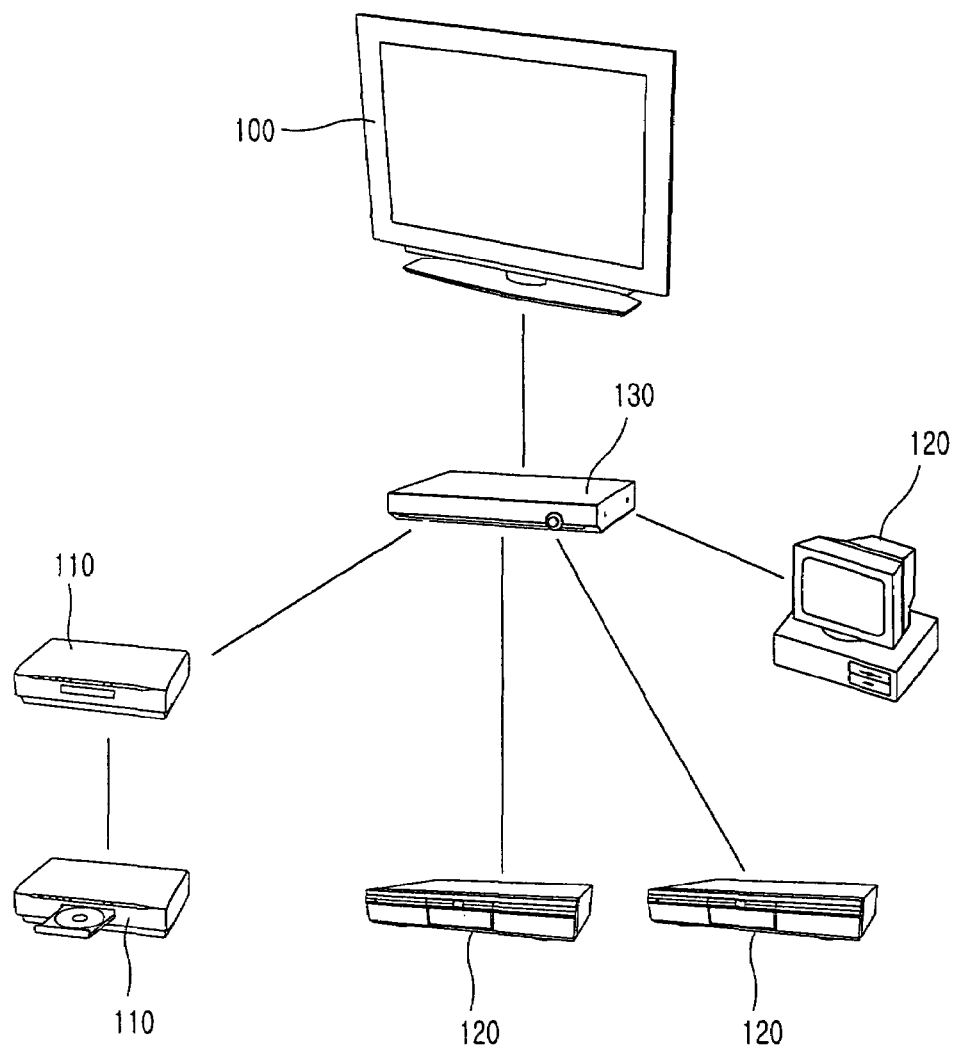
FIG. 1 is an exemplary view showing a connection relation between a display device and a source device in accordance with the conventional art.
Figure 2:
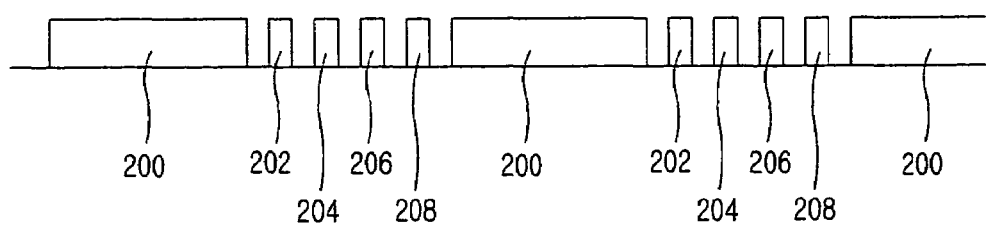
FIG. 2 is an exemplary view showing a format structure of serial data according to the present invention.

FIG. 2 is an exemplary view showing a format structure of serial data according to the present invention.

Herein, the reference numeral 200 denotes a video signal packet having the largest capacity of data. The video signal packets 200 respectively include a video signal of a first horizontal line, and are provided with a header at the front side of the video signal and a tail at the back side thereof.

The video signal of the first horizontal line is divided into a video signal of a blanking block and a video signal of an active block. In case that the video signal is in the blanking block, a blanking header is inserted into a header located at the front side of the video signal, and in case that the video signal is in the active block, an active header is inserted into the header.

Between the video signal packets 200, an audio signal packet 202 including left/right audio signals, a control signal packet 204 including a control signal, a video signal characteristic packet 206 including characteristics such as resolution information of a video signal, and an audio signal characteristic packet 208 including left/right control signals of an audio signal and characteristics of an audio clock signal are located. A header and a tail are respectively formed at the front and back side of the audio signal packet 202, the control signal packet 204, the video signal characteristic packet 206, and the audio signal characteristic packet 208.

Herein, an arrangement order of the audio signal packet 202, the control signal packet 204, the video signal characteristic packet 206, and the audio signal characteristic packet 208 can be changed.

The serial data having said format structure is converted into an optical signal form, and transmitted through an optical fiber. A display device (not shown) receives the serial data transmitted through the optical signal, and then restores a clock signal, horizontal/vertical synchronization signals, horizontal/vertical active signals, and left/right control signals of an audio signal by using the received serial data.

That is, a video clock signal of a certain frequency is generated by resolution information of a video signal stored in the video signal characteristic packet 206 in serial data, and a horizontal synchronization signal and a horizontal active signal are generated by counting the video clock signal on the basis of the header of the video signal packet 200 according to the count value. By counting the generated horizontal synchronization signal, a vertical synchronization signal and a vertical active signal can be generated. Also, by left/right characteristic information of an audio signal stored in the audio signal characteristic packet 208, left/right control signals can be generated and an audio clock signal having a certain frequency can be generated.

Figure 3:
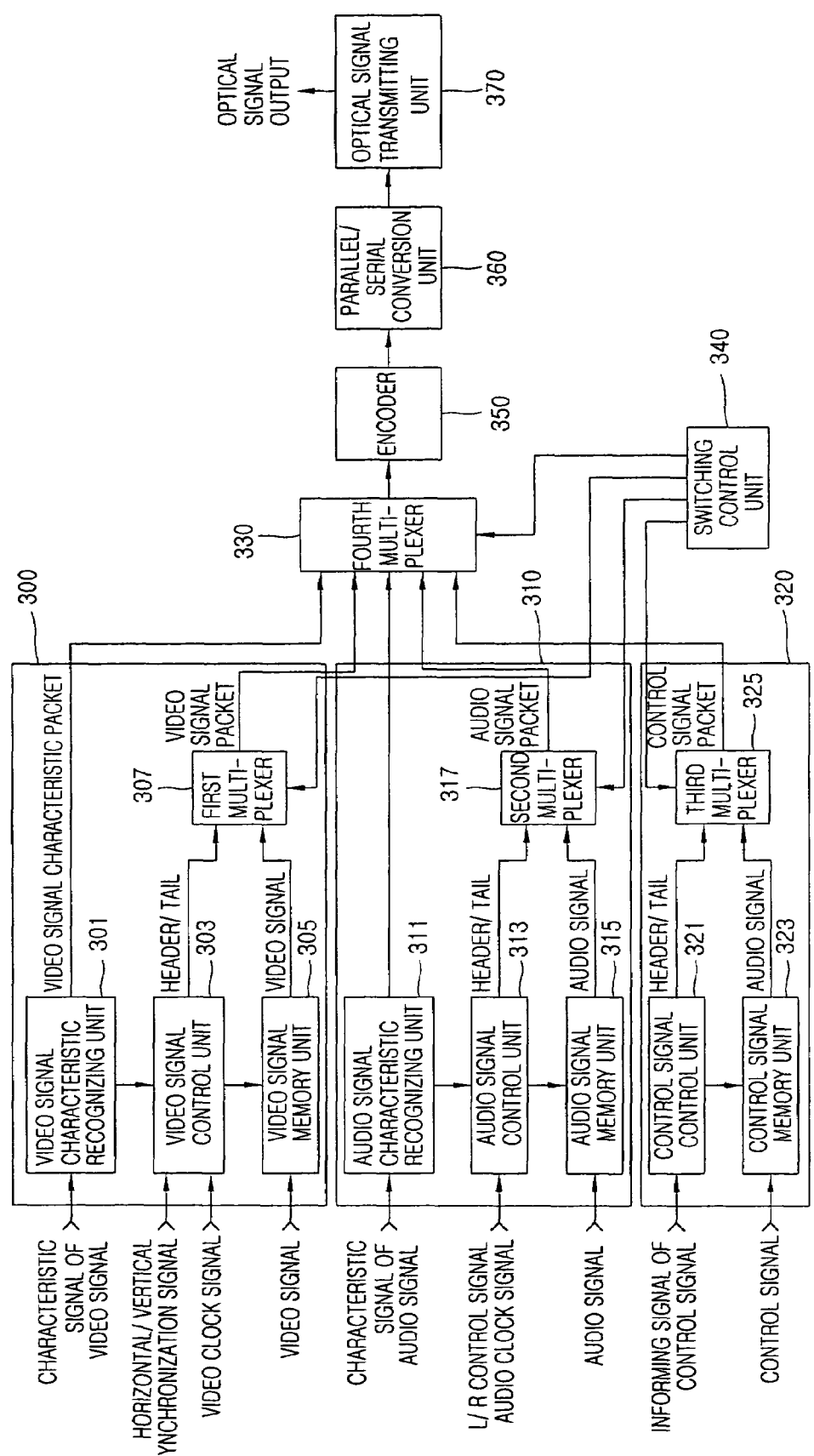
FIG. 3 is a block diagram showing a construction of a serial data conversion apparatus according to the present invention.

FIG. 3 is a block diagram showing a construction of a serial data conversion apparatus according to the present invention.

As shown, the serial data conversion apparatus comprises: a video signal packet conversion unit 300 for converting a characteristic signal of a video signal into a video signal characteristic packet and simultaneously converting a video signal into a video signal packet by the characteristic signal of a video signal, horizontal/vertical synchronization signals, and a video clock signal; an audio signal packet conversion unit 310 for converting a characteristic signal of an audio signal into an audio signal characteristic packet and simultaneously converting an audio signal into an audio signal packet by the characteristic signal of an audio signal, left/right control signals, and an audio clock signal; a control signal packet conversion unit 320 for converting a control signal into a control signal packet by an informing signal which informs a generation of a control signal; a fourth multiplexer 330 for switching and selecting the video signal characteristic packet, the video signal packet, the audio signal characteristic packet, the audio signal packet, and the control signal packet by a certain format structure; a switching control unit 340 for controlling a conversion of the video signal packet, the audio signal packet, and the control signal packet and controlling a switching operation of the fourth multiplexer 330; an encoder 350 for encoding an output signal of the fourth multiplexer 330; a parallel/serial conversion unit 360 for converting an output signal of the encoder 350 into serial data; and an optical signal transmitting unit 370 for converting serial data converted at the parallel/serial conversion unit 360 into an optical signal and then transmitting.

Herein, the video signal packet conversion unit 300 includes: a video signal characteristic recognizing unit 301 for recognizing video signal characteristics by a characteristic signal of a video signal, generating a video signal characteristic packet and outputting; a video signal control unit 303 for generating a header and a tail of a video signal by video signal characteristics recognized by the video signal characteristic recognizing unit, horizontal/vertical synchronization signals, and a video clock signal and simultaneously controlling a storage and an output of a video signal; a video signal memory unit 305 for storing and outputting a video signal by a control of the video signal control unit 303; and a first multiplexer 307 for selecting a header and a tail of the video signal control unit 303 and a video signal of the video signal memory unit 305 by a control of the switching control unit and thus generating a video signal packet.

Also, the audio signal packet conversion unit 310 includes: an audio signal characteristic recognizing unit 311 for recognizing audio signal characteristics by a characteristic signal of an audio signal, generating an audio signal characteristic packet, and outputting; an audio signal control unit 313 for generating a header and a tail of an audio signal by audio signal characteristics recognized by the audio signal characteristic recognizing unit, left/right control signals, and an audio clock signal and simultaneously controlling a storage and an output of an audio signal; an audio signal memory unit 315 for storing and outputting an audio signal by a control of the audio signal control unit 313; and a second multiplexer 317 for selecting a header and a tail of the audio signal control unit 313 and an audio signal of the audio signal memory unit 315 by a control of the switching control unit 340 and thus generating an audio signal packet.

Besides, the control signal packet conversion unit 320 includes: a control signal control unit 321 for generating a header and a tail according to an informing signal of a control signal and controlling a storage and an output of a control signal; a control signal memory unit 323 for storing and outputting a control signal according to a control of the control signal control unit 321; and a third multiplexer 325 for selecting a header and a tail of the control signal control unit 321 and a control signal of the control signal memory unit 323 by a control of the switching control unit 340 and thus generating a control signal packet.

Operations and effects of the serial data conversion apparatus according to the present invention will be explained as follows.

First, the video signal characteristic recognizing unit 301 of the video signal packet conversion unit 300 recognizes video signal characteristics through a characteristic signal of a video signal inputted from outside, inputs the recognized video signal characteristics to the video signal control unit 303, and generates a video signal characteristic packet including video signal characteristics, a header, and a tail.

Subsequently, the video signal control unit 303 controls a video signal to get it to be stored in the video signal memory unit 305 according to video signal characteristics inputted from the video signal characteristic recognizing unit 301, horizontal/vertical synchronization signals inputted from outside, and a video clock signal, generates a header and a tail, and simultaneously outputs the video signal stored in the video signal memory unit 305. At this time, the video signal control unit 303 generates a blanking header in case that a video signal is in a blanking block, and generates an active header in case that a video signal is in an active block.

Then, the switching control unit 340 controls the first multiplexer 307 so that the video signal, the header, and the tail can be sequentially selected, and the first multiplexer 307 outputs a video signal packet including a video signal, a header, and a tail in parallel.

Next, the audio signal packet conversion unit 310 recognizes audio signal characteristics by a characteristic signal of an audio signal inputted from the audio signal characteristic recognizing unit 311, inputs the recognized audio signal characteristics to the audio signal control unit 313, and simultaneously generates an audio signal characteristic packet including audio signal characteristics, a header, and a tail.

In the meantime, the audio signal control unit 313 controls an audio signal by the inputted audio signal characteristics, inputted left/right control signals, and an audio clock signal thus to store the audio signal in the memory unit 315, generates a header and a tail, and simultaneously outputs the stored audio signal by the audio signal memory unit 315.

Subsequently, the switching control unit 340 controls the second multiplexer 317 thus to select the audio signal, the header, and the tail sequentially, and the second multiplexer 317 outputs an audio signal packet including an audio signal, a header, and a tail in parallel.

Also, the control signal packet conversion unit 320 determines a generation of a control signal by an inputted informing signal of a control signal thus to generate a header and a tail of a control signal, controls the control signal memory unit 323 thus to store a control signal, and outputs the stored control signal.

Then, the switching control unit 340 controls the third multiplexer 327 thus to sequentially select the control signal, the header, and the tail, and the third multiplexer 327 outputs a control signal packet including a control signal, a header, and a tail in parallel.

Like this, a video signal characteristic packet and a video signal packet generated from the video signal packet conversion unit 300, an audio signal characteristic packet and an audio signal packet generated from the audio signal packet conversion unit 310, and a control signal packet generated from the control signal packet conversion unit 320 are respectively inputted to the fourth multiplexer 330. The fourth multiplexer 330 sequentially selects the video signal packet, the audio signal packet, the control signal packet, the video signal characteristic packet, and the audio signal characteristic packet and outputs by a control of the switching control unit 340. That is, the switching control unit 340 controls the fourth multiplexer 330 by the format of serial data thus to sequentially select the video signal packet, the audio signal packet, the control signal packet, the video signal characteristic packet, and the audio signal characteristic packet.

The video signal packet, the 8-bit audio signal packet, the control signal packet, the video signal characteristic packet, and the audio signal characteristic packet sequentially selected from the fourth multiplexer 330 are inputted to the encoder 350, and converted into 10-bit data so as to be preferably transmitted as an optical signal form. Then, the data encoded by the encoder 340 is converted into serial data in the parallel/serial conversion unit 360, and then, converted into an optical signal through the optical signal transmitting unit 370, thereby being transmitted to the display device through an optical fiber.

Even if the present invention was explained with regard to the preferred embodiments, it can be variously modified and changed without departing from the spirit or essential characteristics thereof. For example, in the present invention, it was disclosed that the source device converts video/audio/control signals into serial data and then converts into an optical signal form through an optical fiber thus to transmit to the display device. However, in the present invention, video/audio/control signals can be converted into serial data and transmitted through each kind of physical media.

As aforementioned, in the present invention, the source device transmits video/audio/and control signals to the display device through one optical cable as a packet form, so that a seeming problem can be solved.

Also, in the present invention, the display device can output clear videos and audios by restoring a clock signal, horizontal/vertical synchronization signals, horizontal/vertical active signals, and audio left/right control signals by using the serial data format structure including video/audio/and control packet signals without directly transmitting the clock signal, the horizontal/vertical synchronization signals, the horizontal/vertical active signals, and the audio left/right control signals when the source device transmits video/audio/and the control signals to the display device as an optical signal form through an optical fiber.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A serial data conversion apparatus comprising:
a video signal packet conversion unit configured to convert a characteristic signal of a video signal into a video signal characteristic packet and to simultaneously convert a video signal into a video signal packet by the characteristic signal of a video signal, horizontal/vertical synchronization signals, and a video clock signal;
an audio signal packet conversion unit configured to convert a characteristic signal of an audio signal into an audio signal characteristic packet and to simultaneously convert an audio signal into an audio signal packet by the characteristic signal of an audio signal, left/right control signals, and an audio clock signal; and
a control signal packet conversion unit configured to convert a control signal into a control signal packet by an informing signal which informs a generation of a control signal,
wherein the video signal packet conversion unit comprises:
a video signal characteristic recognizing unit configured to recognize video signal characteristics from an input characteristic signal of a video signal and to generate a video signal characteristic packet;
a video signal control unit configured to directly receive the video signal characteristics from the video signal characteristic recognizing unit and to generate a header and a tail of a video signal based on the received video signal characteristics, input horizontal/vertical synchronization signals and a video clock signal and to simultaneously output a video signal;
a video signal memory unit configured to directly receive the video signal output by the video signal control unit and to store video signal; and
a multiplexer directly connected to the video signal control unit and the video signal memory unit and configured to select a header and a tail output by the video signal control unit and a video signal output by the video signal memory unit to thus generating a video signal packet.

2. The apparatus of claim 1, wherein the audio signal packet conversion unit comprises:
an audio signal characteristic recognizing unit configured to recognize audio signal characteristics by a characteristic signal of an audio signal and generating an audio signal characteristic packet;
an audio signal control unit configured to generate a header and a tail of an audio signal by audio signal characteristics recognized by the audio signal characteristic recognizing unit, left/right control signals, and an audio clock signal and to simultaneously control a storage and an output of an audio signal;
an audio signal memory unit configured to store and output an audio signal by a control of the audio signal control unit; and
a multiplexer configured to select a header and a tail of the audio signal control unit and an audio signal of the audio signal memory unit by a control of the switching control unit and to thus generate an audio signal packet.

3. The apparatus of claim 1, wherein the control signal packet conversion unit comprises:
a control signal control unit configured to generate a header and a tail according to an informing signal of a control signal and to control a storage and an output of a control signal;
a control signal memory unit configured to store and output a control signal according to a control of the control signal control unit; and
a multiplexer configured to select a header and a tail of the control signal control unit and a control signal of the control signal memory unit by a control of the switching control unit and to thus generate a control signal packet.

4. A serial data conversion apparatus comprising:
a video signal packet conversion unit configured to convert a characteristic signal of a video signal into a video signal characteristic packet and to simultaneously convert a video signal into a video signal packet by the characteristic signal of a video signal, horizontal/vertical synchronization signals, and a video clock signal;
an audio signal packet conversion unit configured to convert a characteristic signal of an audio signal into an audio signal characteristic packet and to simultaneously convert an audio signal into an audio signal packet by the characteristic signal of an audio signal, left/right control signals, and an audio clock signal;
a control signal packet conversion unit configured to convert a control signal into a control signal packet by an informing signal which informs a generation of a control signal;
a multiplexer configured to switch and select the video signal characteristic packet, the video signal packet, the audio signal characteristic packet, the audio signal packet, and the control signal packet by a certain format structure;
a switching control unit configured to control a conversion of the video signal packet, the audio signal packet, and the control signal packet and controlling a switching operation of the multiplexer;
an encoder configured to encode an output signal of the multiplexer;
a parallel/serial conversion unit configured to convert an output signal of the encoder into serial data; and
an optical signal transmitting unit configured to convert serial data converted at the parallel/serial conversion unit into an optical signal and then transmitting,
wherein the video signal packet conversion unit comprises:
a video signal characteristic recognizing unit configured to recognize video signal characteristics from an input characteristic signal of a video signal and to generate a video signal characteristic packet;
a video signal control unit configured to directly receive the video signal characteristics from the video signal characteristic recognizing unit and to generate a header and a tail of a video signal based on the received video signal characteristics, input horizontal/vertical synchronization signals and a video clock signal and to simultaneously output a video signal;
a video signal memory unit configured to directly receive the video signal output by the video signal control unit and to store video signal; and
a multiplexer directly connected to the video signal control unit and the video signal memory unit and configured to select a header and a tail output by the video signal control unit and a video signal output by the video signal memory unit to thus generating a video signal packet.

5. The apparatus of claim 4, wherein the audio signal packet conversion unit comprises:
an audio signal characteristic recognizing unit configured to recognize audio signal characteristics by a characteristic signal of an audio signal and to generate an audio signal characteristic packet;

an audio signal control unit for configured to generate a header and a tail of an audio signal by audio signal characteristics recognized by the audio signal characteristic recognizing unit, left/right control signals, and an audio clock signal and to simultaneously control a storage and an output of an audio signal;

an audio signal memory unit configured to store and output an audio signal by a control of the audio signal control unit; and a multiplexer configured to select a header and a tail of the audio signal control unit and an audio signal of the audio signal memory unit by a control of the switching control unit and to thus generate an audio signal packet.

6. The apparatus of claim 4, wherein the control signal packet conversion unit comprises:

a control signal control unit configured to generate a header and a tail according to an informing signal of a control signal and to control a storage and an output of a control signal;

a control signal memory unit configured to store and outputting a control signal according to a control of the control signal control unit; and a multiplexer configured to select a header and a tail of the control signal control unit and a control signal of the control signal memory unit by a control of the switching control unit and to thus to generate a control signal packet.

* * * * *